(12) United States Patent
Torii et al.

(10) Patent No.: US 8,379,096 B2
(45) Date of Patent: Feb. 19, 2013

(54) INFORMATION PROCESSING APPARATUS AND METHOD FOR SYNTHESIZING CORRECTED IMAGE DATA

(75) Inventors: Satoru Torii, Fuchu (JP); Yoshinori Shindo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/764,546

(22) Filed: Apr. 21, 2010

(65) Prior Publication Data

US 2010/0295953 A1 Nov. 25, 2010

(30) Foreign Application Priority Data

May 21, 2009 (JP) ................................. 2009-123541

(51) Int. Cl.
*H04N 5/228* (2006.01)
(52) U.S. Cl. ................................ 348/208.4; 348/208.99
(58) Field of Classification Search ............. 348/333.12, 348/333.03, 208.1, 208.14, 352, 402.1, 413.1, 348/416.1, E7.007, E7.008
See application file for complete search history.

(56) References Cited

U.S. PATENT DOCUMENTS

| | | | |
|---|---|---|---|
| 6,735,383 B2 | 5/2004 | Imada | |
| 7,176,962 B2 | 2/2007 | Ejima | |
| 2006/0158523 A1* | 7/2006 | Estevez et al. | 348/208.4 |
| 2007/0103562 A1 | 5/2007 | Kaneko et al. | |
| 2007/0253732 A1 | 11/2007 | Usui | |
| 2008/0030587 A1* | 2/2008 | Helbing | 348/208.4 |
| 2008/0112644 A1* | 5/2008 | Yokohata et al. | 382/278 |
| 2008/0143840 A1* | 6/2008 | Corkum et al. | 348/208.6 |
| 2009/0123083 A1* | 5/2009 | Kawase et al. | 382/254 |
| 2009/0154821 A1* | 6/2009 | Sorek et al. | 382/250 |
| 2010/0295954 A1* | 11/2010 | Kotani | 348/208.4 |
| 2011/0050920 A1* | 3/2011 | Siddiqui et al. | 348/208.6 |

FOREIGN PATENT DOCUMENTS

| | | |
|---|---|---|
| JP | 2002-214657 A | 7/2002 |
| JP | 2002-258351 A | 9/2002 |
| JP | 2006-74693 A | 3/2006 |
| JP | 2006-86762 | 3/2006 |

* cited by examiner

*Primary Examiner* — Nicholas Giles
*Assistant Examiner* — Abdelaaziz Tissire
(74) *Attorney, Agent, or Firm* — Fitzpatrick, Cella, Harper & Scinto

(57) ABSTRACT

A plurality of image capturing data time-divisionally exposed by a capturing unit are input. By first and second processes, the plurality of image capturing data are divided into synthesis images or motion detection images, a motion amount of the capturing unit at the time of time-division exposure is detected from the image capturing data of the motion detection images, synthesized image capturing data is generated by synthesizing the synthesis images, and a vibration of the synthesized image capturing data is corrected based on a divide pattern indicating divisions and the motion amount. Corrected image capturing data obtained by the first and second processes are integrated to obtain image capturing data after image stabilization.

15 Claims, 15 Drawing Sheets

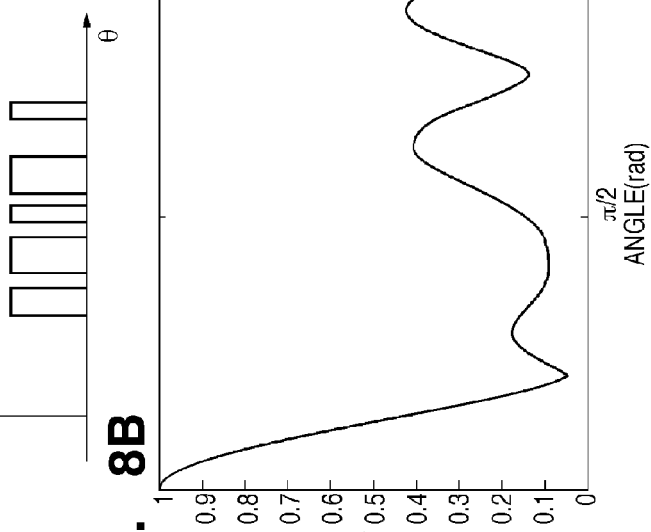
FIG. 7A
FIG. 7B
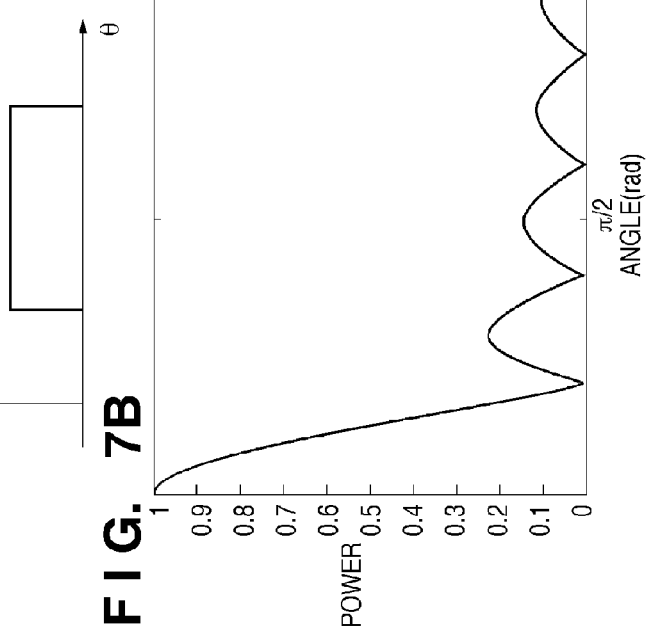
FIG. 8A
FIG. 8B

INFORMATION PROCESSING APPARATUS AND METHOD FOR SYNTHESIZING CORRECTED IMAGE DATA

BACKGROUND OF THE INVENTION

1. Field of the Invention

The present invention relates to image stabilization of image capturing data.

2. Description of the Related Art

A digital image easily allows an enlarged-scale display over 100% using a personal computer. In an enlarged image, an image blur due to even a slight camera shake stands out. For this reason, as an image capturing device of a digital camera gains higher resolutions, a process for correcting for camera shake at the time of imaging has received a lot of attention.

An image-stabilization method includes those implemented by hardware and software. In a method implemented by hardware, a gyro sensor is mounted on a camera, and the influence of camera shake is eliminated by driving a lens and image capturing device to cancel vibrations of the camera during exposure based on an output signal from the gyro sensor. An image-stabilization method by means of a lens optical system is described in, for example, Japanese Patent Laid-Open No. 2002-214657.

The hardware image-stabilization method poses problems related to an increase in number of components and manufacturing cost. When a similar function is to be implemented in an inexpensive digital camera, a software image-stabilization method is required.

As the software image-stabilization method, a method for synthesizing an image obtained by short exposure (to be referred to as a short exposure image hereinafter) and that obtained by long exposure (to be referred to as a long exposure image hereinafter) has been proposed (for example, Japanese Patent Laid-Open No. 2002-258351). Also, a method of acquiring a plurality of short exposure images, and synthesizing these images has been proposed (for example, Japanese Patent Laid-Open Nos. 2006-074693 and 2006-086762).

The method of Japanese Patent Laid-Open No. 2002-258351 corrects high-frequency components of the long exposure image using the short exposure image to recover an image blur. The method of Japanese Patent Laid-Open No. 2006-074693 aligns a plurality of short exposure images obtained by exposure that time-divisionally controls opening and closing timings of a shutter (to be referred to as time-division exposure), so as to reduce their difference, and synthesizes these images, thereby recovering from an image blur. Likewise, the method of Japanese Patent Laid-Open No. 2006-086762 synthesizes a plurality of images after blur correction while aligning their positions, thereby recovering an image blur.

However, the methods of Japanese Patent Laid-Open Nos. 2006-074693 and 2006-086762 suffer the following problems. In order to appropriately recover an image blur, a plurality of short exposure images are appropriately synthesized according to their displacement amounts. In other words, the appropriate image blur recovery process requires to accurately acquire displacement amounts. Therefore, a displacement amount between a given short exposure image and that captured immediately before or after that image has to be calculated. However, a process for accurately calculating a displacement amount and that for deforming and synthesizing images in correspondence with the displacement amount require very high calculation cost, resulting in a continuous shooting speed drop and a decrease in number of image capturing data that can be buffered.

SUMMARY OF THE INVENTION

In one aspect, an image processing method comprising: an input step of inputting a plurality of image capturing data time-divisionally exposed by a capturing unit; first and second processing steps of respectively performing a divide process, a detective process, a synthetic process, and a correction process, wherein the divide process divides the plurality of image capturing data into synthesis images or motion detection images according to a divide pattern, the detective process detects a motion amount of the capturing unit at the time of time-division exposure from the image capturing data of the motion detection images, the synthetic process generates synthesized image capturing data by synthesizing the synthesis images, and the correction process corrects a vibration of the synthesized image capturing data based on the divide pattern and the motion amount; and a synthesis step of synthesizing corrected image capturing data output in the first and second processing steps to obtain image capturing data after image stabilization.

According to the aspect, image stabilization of image capturing data can be effectively performed.

Further features of the present invention will become apparent from the following description of exemplary embodiments with reference to the attached drawings.

BRIEF DESCRIPTION OF THE DRAWINGS

FIGS. 7A and 7B are graphs showing the shape and frequency characteristics of a PSF when $h(t)=1$ for $0 \leq t \leq T$ as a normal exposure condition and $h(t)=0$ for the other case.

FIGS. 8A and 8B are graphs showing the shape and frequency characteristics of a PSF after coded exposure.

DESCRIPTION OF THE EMBODIMENTS

Image processes according to embodiments of the present invention will be described in detail hereinafter with reference to the drawings. Note that an example in which an arrangement for correcting camera shake is built in a digital camera will be explained hereinafter.

First Embodiment

[Arrangement of Camera]

Figure 1A:
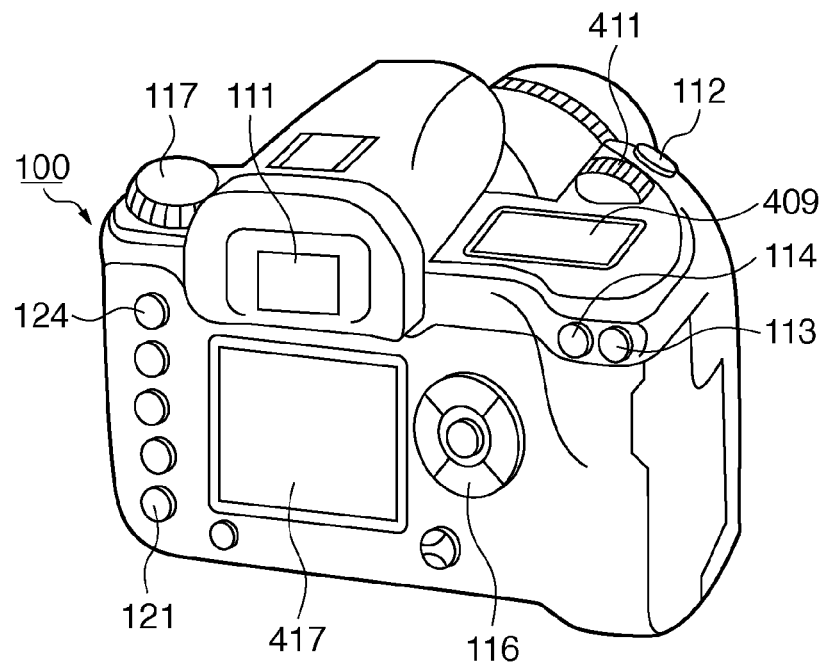
FIGS. 1A and 1B are respectively a perspective view and cross-sectional view of a digital camera.
Figure 1B:
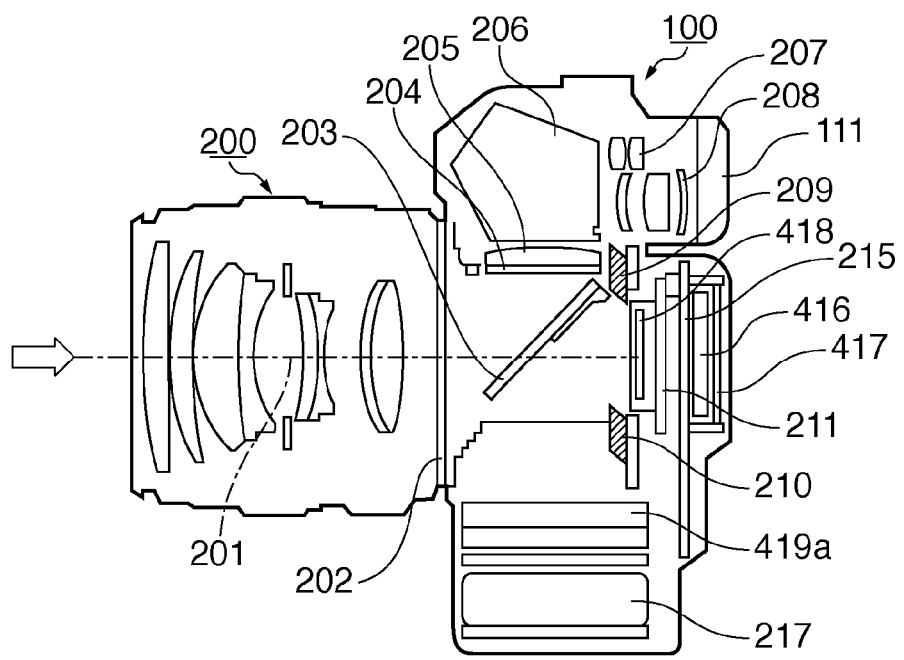

FIGS. 1A and 1B are respectively an external view and cross-sectional view of a digital camera.

A viewfinder eyepiece 111, auto-exposure (AE) lock button 114, button 113 used to select auto-focus (AF) points, and release button 112 used to start an imaging operation are arranged on the top portion of a camera body 100. Also, an imaging mode selection dial 117, external display unit 409, digital dial 411, and the like are arranged.

The digital dial 411 serves as a multi-function signal input unit which is used to input a numerical value to the camera in cooperation with another operation button and to switch an imaging mode. The external display unit 409 as an LCD panel displays imaging conditions including a shutter speed, stop, and imaging mode, and other kinds of information.

On the back surface of the camera body 100, a liquid crystal display (LCD) monitor 417 which displays an image caught by the camera, that captured by the camera, various setting screens, and the like, a switch 121 used to turn on/off display of the LCD monitor 417, cross keys 116, a menu button 124, and the like are arranged. Since the LCD monitor 417 is of transmission type, the user cannot view an image by driving only the LCD monitor 417. For this reason, a backlight is required on the rear surface of the LCD monitor 417, as will be described later.

The cross keys 116 include four buttons arranged at upper, lower, right, and left positions, and a setting button arranged at the center, and are used to instruct to select and execute menu items displayed on the LCD monitor 417.

The menu button 124 is used to display a menu screen on the LCD monitor 417. For example, when the user wants to select and set an imaging mode, he or she presses the menu button 124, and then selects a desired imaging mode by operating the upper, lower, right, and left buttons of the cross keys 116. Then, the user presses the setting button while the desired imaging mode is selected, thus completing the setting of the imaging mode. Note that the menu button 124 and cross keys 116 are also used to set an AF mode to be described later.

An imaging lens 200 of an image optical system is detachable from the camera body 100 via a lens mount 202.

A mirror 203, arranged in an imaging optical path having an imaging optical axis 201 as the center, is allowed to be quickly returned between a position where object light from the imaging lens 200 is guided to a viewfinder optical system (slant position) and an escape position outside the imaging optical path.

Object light guided to the viewfinder optical system by the mirror 203 forms an image on a focusing screen 204. The object light passed through the focusing screen 204 is guided to an eyepiece lens 208 and photometry sensor 207 via a condenser lens 205 and pentagonal roof prism 206, which are required to improve the visibility of a viewfinder.

A first curtain 210 and second curtain 209 form a focal plane shutter (mechanical shutter). By opening and closing the two curtains 209 and 210, an image capturing device 418 such as a charge-coupled device (CCD) or CMOS sensor, which is arranged behind these curtains, is exposed for a required time. The image capturing device 418 is held on a printed circuit board 211. Another printed circuit board 215 is arranged behind the printed circuit board 211, and the LCD monitor 417 and a backlight 416 are arranged on the surface, opposite to the board 211, of the printed circuit board 215.

Furthermore, the camera body 100 includes a recording medium 419a used to record image data, and a battery 217 as a portable power supply. Note that the recording medium 419a and battery 217 are detachable from the camera body 100.

Figure 2:
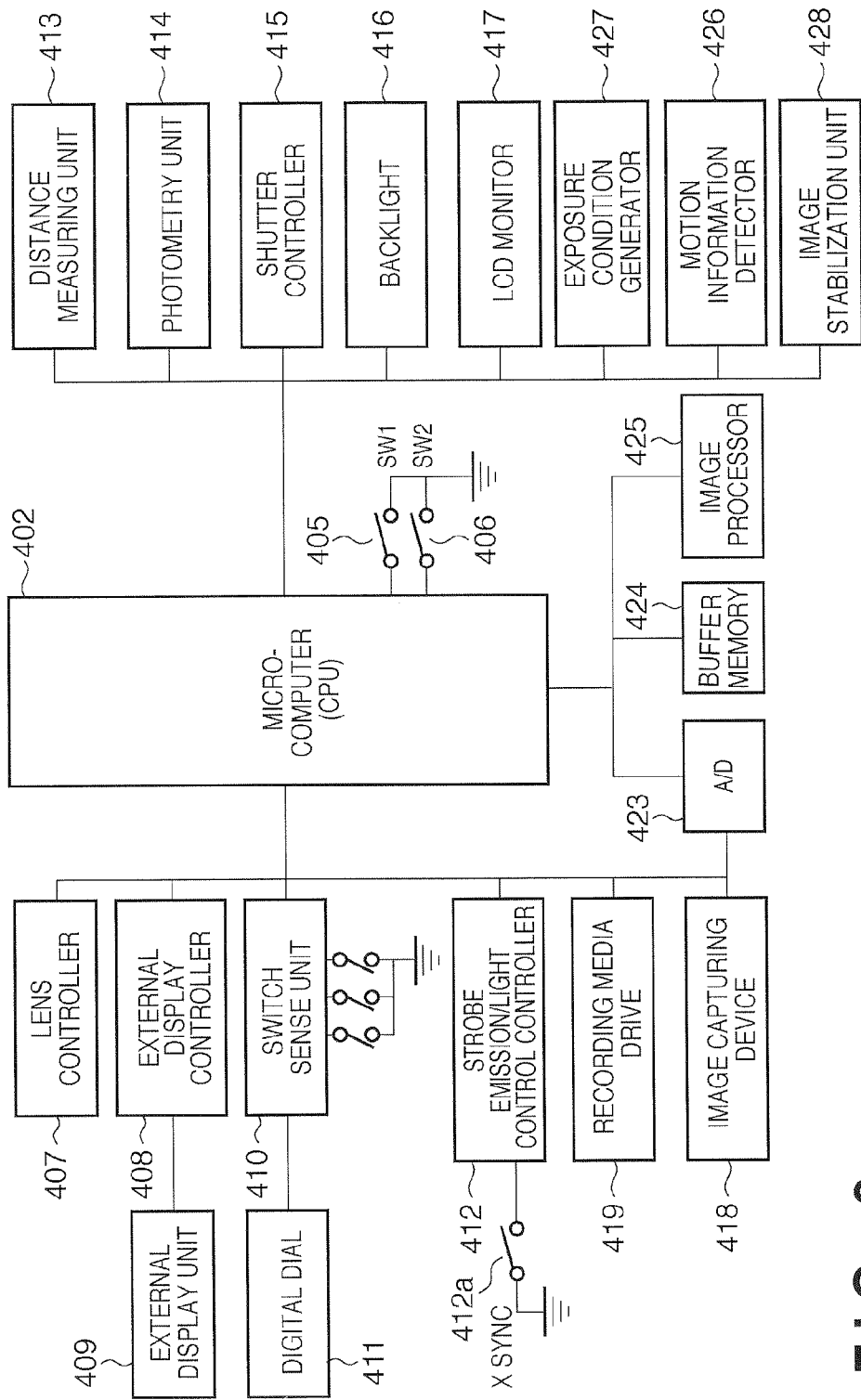
FIG. 2 is a block diagram showing the arrangement associated with control, imaging, and image processes of the digital camera.

FIG. 2 is a block diagram showing the arrangement associated with control, imaging, and image processes of the digital camera.

A microcomputer (CPU) 402 controls the operation of the overall camera including the processes of image data output from the image capturing device 418 and display control of the LCD monitor 417.

A switch (SW1) 405 is turned on when the release button 112 is pressed halfway (a halfway pressing state). When the switch (SW1) 405 is turned on, the camera is set in an imaging ready state. A switch (SW2) 406 is turned on when the release button 112 is fully pressed (a full pressing state). When the switch (SW2) 406 is turned on, the camera body 100 starts an imaging operation.

A lens controller 407 communicates with the imaging lens 200 to execute driving control of the imaging lens 200 and that of an aperture in an AF mode. An external display controller 408 controls the external display unit 409 and a display unit (not shown) inside the viewfinder. A switch sense unit 410 is an interface used to transfer signals output from many switches and keys including the aforementioned digital dial 411 to the CPU 402.

A strobe controller 412 is grounded through an X sync 412a to control light emission and execute light control of an external strobe. To a recording media drive 419, the recording medium 419a such as a hard disk or memory card is attached.

A distance measuring unit 413 detects a defocus amount with respect to an object for the purpose of AF control. A photometry unit 414 measures a luminance level of an object to decide an aperture and exposure time. A shutter controller 415 controls the mechanical shutter so as to properly expose the image capturing device 418. The LCD monitor 417 and backlight 416 form a display device, as described above.

An image processor 425 includes a digital signal processor (DSP). A motion information detector 426 detects a camera motion due to, for example, camera shake by a gyro sensor. The output from the motion information detector 426 is used to drive the imaging lens 200 and image capturing device 418 to cancel camera vibrations.

An exposure condition generator 427 generates an exposure condition required to correct an image blur due to a vibration, and controls an electronic shutter based on the generated exposure condition. Note that the electronic shutter is controlled by sweep-out pulses and read pulses supplied to the image capturing device 418.

Furthermore, an analog-to-digital converter (A/D) 423, a buffer memory 424 used to buffer image data, and the like are connected to the CPU 402.

[Acquisition of Image Data]

As will be described in detail later, the A/D 423 and image processor 425 process images, which are time-divisionally exposed under the control of the exposure condition generator 427 within a time period decided by the photometry unit 414, thereby acquiring a plurality of image capturing data of an object.

Note that the image capturing data is data before demosaicing (developing process) (to be also referred to as RAW data hereinafter), which is obtained by converting a signal output from the image capturing device 418 as a capturing unit into digital data by the A/D 423. Note that at least the image capturing device 418 forms the capturing unit. A combination of the image capturing device 418, A/D 423, and imaging lens 200 is often called a capturing unit. Alternatively, the camera body 100 is often called a capturing unit.

An image stabilization unit 428 additionally synthesizes image capturing data selected according to a divide pattern (to be described later). Then, the image stabilization unit 428 applies an image stabilization process to the synthesized image capturing data based on the divide pattern and motion information output from the motion information detector 426, thereby generating image capturing data in which a blur due to a vibration is corrected.

The image processor 425 applies demosaicing to the image capturing data corrected by the image stabilization unit 428 to generate image data. Then, the image processor 425 applies various image processes to the generated image data, and stores the image data after the image processes in the recording medium. Note that image capturing data before demosaicing may be stored in the recording medium.

[Overview of Coded Exposure Process]

The image stabilization unit 428 corrects an image blur due to, for example, camera shake using a technique called coded exposure. The coded exposure is a technique for correcting an image blur using correlations between images obtained by randomly opening and closing a shutter during a designated exposure time (flutter shutter), and an opening and closing pattern of the shutter.

A basic sequence of the coded exposure process will be described below taking as an example a case in which an image blur due to a vibration in a rotation direction (rotary vibration) is to be corrected. After that, the coded exposure process of this embodiment will be explained.

Figure 3:
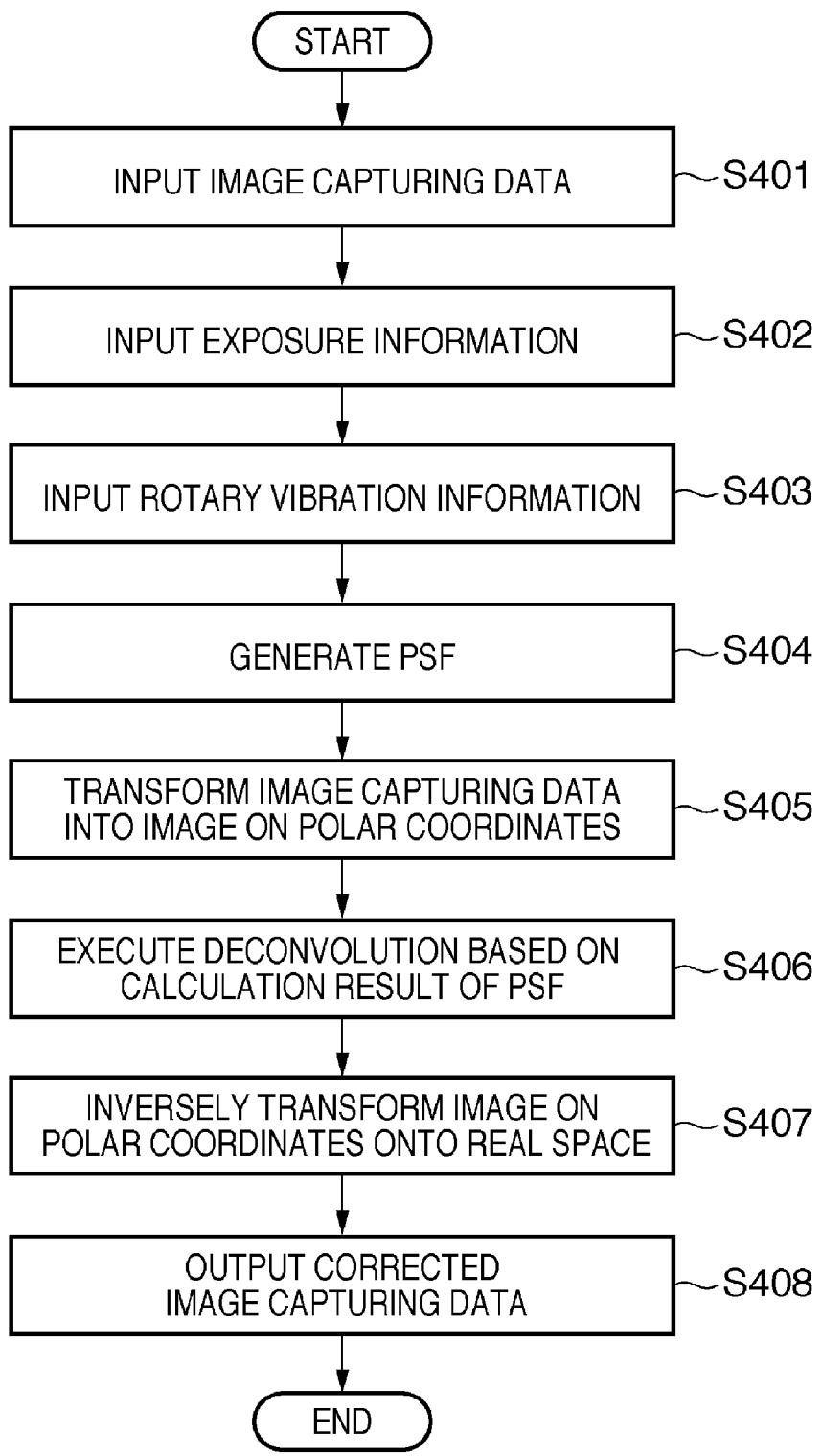
FIG. 3 is a flowchart for explaining a process for correcting an image blur by a coded exposure process.

FIG. 3 is a flowchart for explaining a process for correcting an image blur by the coded exposure process.

Image capturing data captured by the flutter shutter are input (S401).

Let I(x, y) be an intensity of light that enters a pixel (x, y) of the image capturing device 418 per unit time, ω(t) be an angular velocity, and T be an exposure time. Since information obtained by rotating I(x, y) through −θ(T−t) enters the camera at time t, image capturing data $I_{blur}$ is expressed by the following formulas. Note that the origin of the coordinate system is matched with the position coordinates of a rotational center indicated by rotary vibration information (to be described later).

$$I_{blur}(x, y) = 1/T \cdot \int_{t=0}^{T} h(t)I\{x \cdot \cos\theta(T-t) + y \cdot \sin\theta(T-t), \quad (1)$$
$$-x \cdot \sin\theta(T-t) + y \cdot \cos\theta(T-t)\}dt$$

$$= 1/T \cdot \int_{t=0}^{T} h(T-t)I\{x \cdot \cos\theta(t) + y \cdot \sin\theta(t),$$
$$-x \cdot \sin\theta(t) + y \cdot \cos\theta(t)\}dt$$

$$= 1/T \cdot \int_{\omega=0}^{\omega} h(\theta)/\omega(\theta) \cdot I\{x \cdot \cos\theta + y \cdot \sin\theta, \quad (2)$$
$$-x \cdot \sin\theta + y \cdot \cos\theta\}d\theta$$

-continued
$$= 1/T \cdot \int_{\omega=0}^{\omega} h'(\theta) \cdot I\{x \cdot \cos\theta + y \cdot \sin\theta, \quad (3)$$
$$-x \cdot \sin\theta + y \cdot \cos\theta\}d\theta$$

where a function h(t) represents opening and closing of the shutter: shutter open=1; shutter close=0.

In the modification from formula (1) to formula (2), an integration variable is transformed. ω(t)=dθ/dt. Also, ω(θ) is a function by rewriting h(t) to have θ as a variable using the relationship between t and θ. Likewise, h(θ) is a function by rewriting h(t) to have θ as a variable using the relationship between t and θ. In formula (3), h'(θ)=h(θ)/ω(θ).

Next, exposure information indicating the shutter opening and closing pattern is input (S402), and rotary vibration information indicating the relationship between a vibration angle θ and time is input (S403). Then, as will be described in detail later, h'(θ) as a point spread function (PSF) on polar coordinates is calculated based on the rotary vibration information and exposure information (S404).

Then, the image capturing data is transformed into an image on the polar coordinates (S405). As described above, the origin of the orthogonal coordinate system in this transformation is matched with the central coordinates of a rotation indicated by the rotary vibration information. By polar coordinate transformation, formula (3) is transformed into:

$$I_{blur}(r, \Theta) = 1/T \cdot \int_{\omega=0}^{\omega} h'(\theta)I(r, \Theta - \theta)d\theta = 1/T \cdot (h' * I)(r, \Theta) \quad (4)$$

where * represents a convolution operation, and
(x, y) in formula (3) is r(cos Θ, sin Θ).

Formula (4) is the same formula as a vibration with respect to translation, and can be considered as that which has undergone convolution by h'(θ) as the PSF. However, formula (4) is a logical formula, and actual data are digital values. Hence, arbitrary interpolation is required to transform a real space into a polar coordinate space. An arbitrary interpolation method can be used. In this embodiment, a bilinear method is used.

As will be described in detail later, deconvolution that cancels the convolution of formula (4) is made based on the calculation result of the PSF (S406). A deconvolution algorithm may use an existing arbitrary algorithm. For example, divisions on a frequency space, a Lucy-Richardson algorithm, an algorithm using a Wiener filter, an algorithm using a normalized filter, and the like are available. In this embodiment, as will be described in detail later, the shape of h'(θ) is controlled by controlling the opening and closing pattern, thus implementing the divisions on the frequency space.

Since I(r, Θ) is obtained by the deconvolution, I(r, Θ) is inversely transformed into a real space indication I(x, y) (S407). This inverse transformation requires an interpolation process as in the transformation from the real space into the polar coordinate space. Then, I(x, y) is output as image capturing data after correction (S408).

Figure 4:
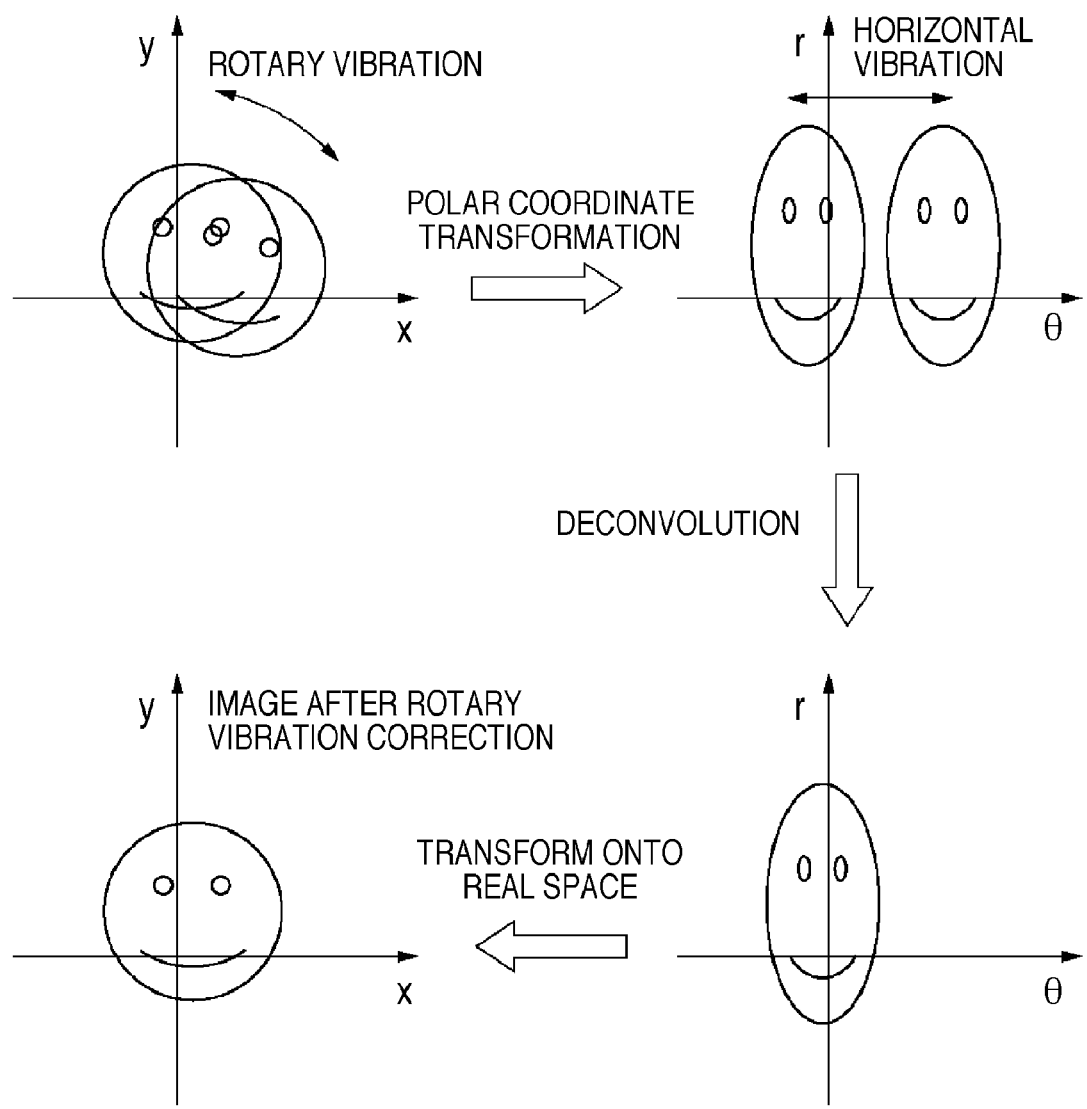
FIG. 4 is a conceptual view showing the correction principle of an image blur.

FIG. 4 is a conceptual view showing the correction principle of an image blur. That is, a rotary vibration is transformed into a vibration in an angle Θ-axis direction (horizontal vibration) by the polar coordinate transformation, and the horizontal vibration of the image is removed by the deconvolution. The image in which the horizontal vibration is removed is inversely transformed into the real space, thus obtaining an image in which the rotary vibration is removed.

In this manner, for images obtained by the flutter shutter, an image blur due to a rotary vibration can be corrected based on the opening and closing pattern (exposure information) of the flutter shutter and the rotary vibration information. Note that the rotary vibration information can be acquired from the motion information detector 426, and the exposure information can be acquired from the exposure condition generator 427 in this embodiment.

In the description of the above example, since an image blur due to a rotary vibration is a correction target, the processes are executed after image capturing data is transformed onto polar coordinates. However, by executing the processes without transforming image capturing data onto polar coordinates, a blur due to a vibration in the horizontal direction (horizontal vibration) and that in the vertical direction (vertical vibration), which are so-called shift vibrations, can also be corrected. For example, a blur due to shift vibrations may be corrected before transformation onto polar coordinates, and a blur due to a rotary vibration may then be corrected.

PSF Generation Method

Figure 5:
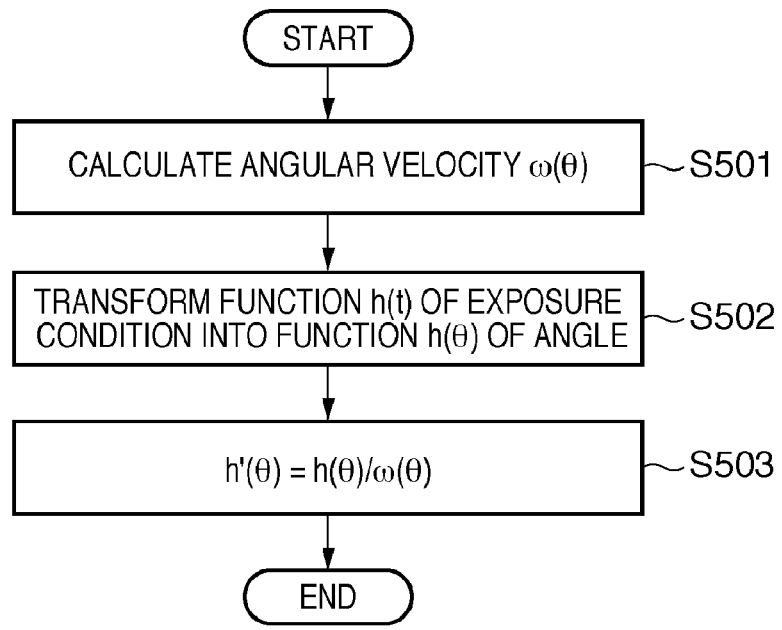
FIG. 5 is a flowchart for explaining a PSF generation process.

FIG. 5 is a flowchart for explaining the PSF generation process (S404).

An angular velocity $\omega(t)$ is calculated by differentiating an angle $\theta$ by a time based on the input rotary vibration information (S501). By combining the angular velocity $\omega(t)$ and $\theta(t)$, the angular velocity can be expressed as a function of $\theta$. Let $\omega(\theta)$ be this function.

Next, a function $h(t)$ is acquired as a function of $\theta$ based on the input exposure information and rotary vibration information (S502). Let $h(\theta)$ be this function.

Then, $h'(\theta)=h(\theta)/\omega(\theta)$ is calculated as a PSF based on the acquired information (S503). As described by formula (3), $h'(\theta)$ is the PSF on the polar coordinates.

Figure 6:
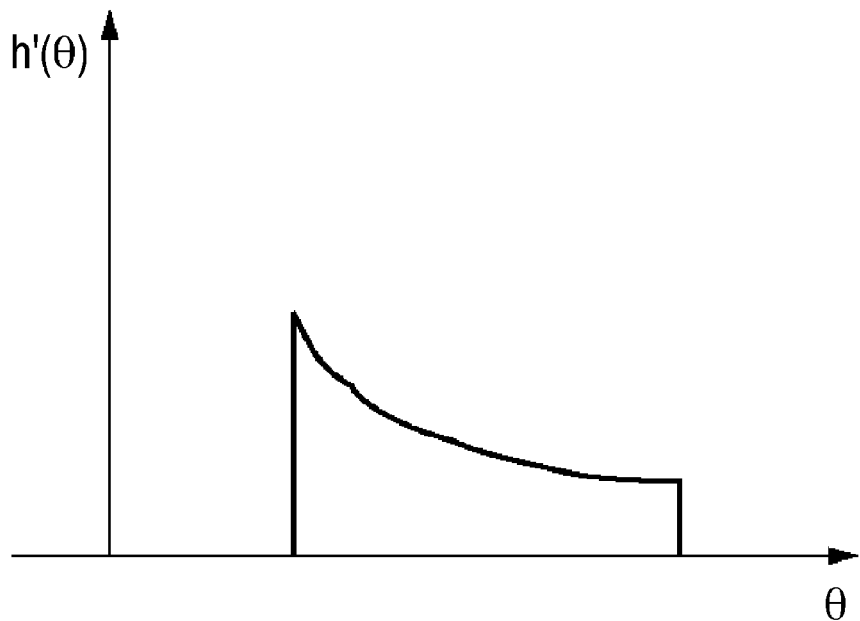
FIG. 6 is a graph showing an example of a PSF in a general rotary motion.

FIG. 6 shows an example of a PSF in a general rotary motion. In FIG. 6, the abscissa plots the angles (rad), and the ordinate plots the values of the PSF. Assuming that the opening and closing pattern is given by $h(t)=1$ for $0\leq t\leq T$ and by $h(t)=0$ for the other case, and an acceleration motion is being made, since $\omega(\theta)$ increases, the value of $h'(\theta)$ as the PSF decreases.

Deconvolution

The transformation of formula (4) onto the frequency space yields:

$$I_{blur}(f,\rho)=1/T\cdot H'(f,\rho)I(f,\rho) \quad (5)$$

where f is a variable corresponding to the frequency transformation of r, and $\rho$ is a variable corresponding to the frequency transformation of $\Theta$.

Since $H'(f,\rho)$ is given, when $I_{blur}(f,\rho)$ is divided by $H'(f,\rho)$ on the frequency space, $I(f,\rho)$ is calculated in principle. However, this poses a problem, and the following description will be made under the assumption that $\omega(\theta)$ is constant in consideration of a vibration due to an equi-angular velocity motion.

FIG. 7A shows the shape of a PSF when $h(t)=1$ for $0\leq t\leq T$ as a normal exposure condition and $h(t)=0$ for the other case (which defines not a flutter shutter but a shutter that is continuously open during a shutter open period). FIG. 7B shows the frequency characteristics of the PSF shown in FIG. 7A. In FIG. 7A, the abscissa plots the angles (rad), and the ordinate plots the values of the PSF. In FIG. 7B, the abscissa plots the angles (rad), and the ordinate plots the absolute values of $H'(f,\rho)$.

Referring to FIG. 7B, frequencies having an absolute value=0 periodically appear. This represents a loss of information corresponding to that frequency. When deconvolution is applied in such state, waveforms (patterns) appear in correspondence with the information-lost frequencies. Hence, coded exposure is made to prevent occurrence of the information-lost frequencies. In other words, in order to prevent occurrence of frequencies having a PSF absolute value=0, the opening and closing timings and open (or close) durations are randomly controlled during the open period of the shutter, thus attaining the flutter shutter.

FIG. 8A shows the shape of a PSF after coded exposure, and FIG. 8B shows the frequency characteristics of the PSF shown in FIG. 8A.

After coded exposure, since no information-lost frequencies appear, as shown in FIG. 8B, perfect deconvolution can be theoretically attained by dividing $I_{blur}(f,\rho)$ by $H'(f,\rho)$.

Figure 9A:
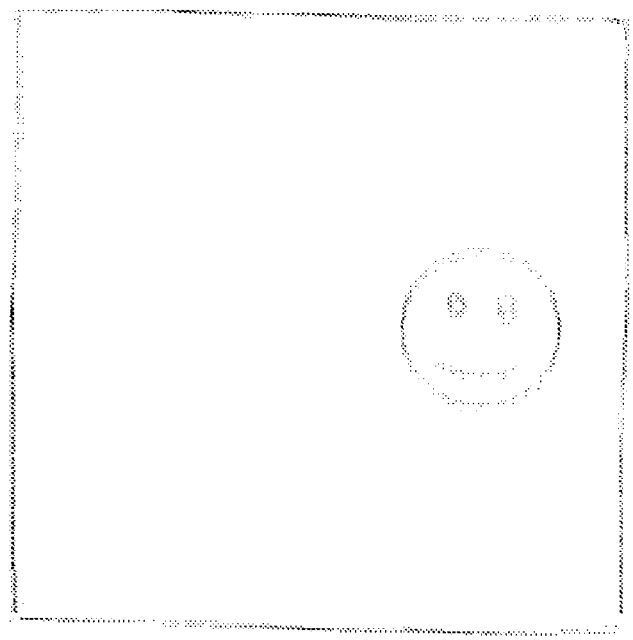
FIGS. 9A and 9B are views respectively showing an image blurred by a rotary vibration and an image in which a blur due to the rotary vibration is corrected.
Figure 9B:
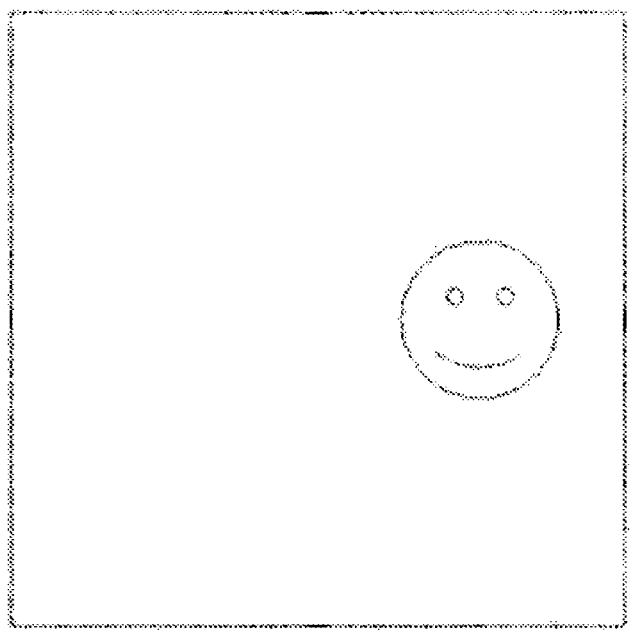

FIG. 9A shows an image (simulation) blurred by a rotary vibration, and FIG. 9B shows an image in which a blur due to the rotary vibration is corrected.

In this manner, an image in which a blur due to a rotary vibration is corrected can be obtained from image capturing data for one image using the rotary vibration information, the opening and closing pattern of the flutter shutter, mutual transformations between the real space and polar coordinate space, and deconvolution. Also, as can be seen from the above description, information required for the correction process of a blur due to a rotary vibration includes the opening and closing pattern, vibration information, and a blurred image due to a vibration generated by additionally synthesizing images according to the opening and closing pattern.

[Image Stabilization Unit]

This embodiment implements a process equivalent to the coded exposure process by dividing whether or not images obtained by time-division exposure are adopted as captured images, without using any flutter shutter.

Figure 10:
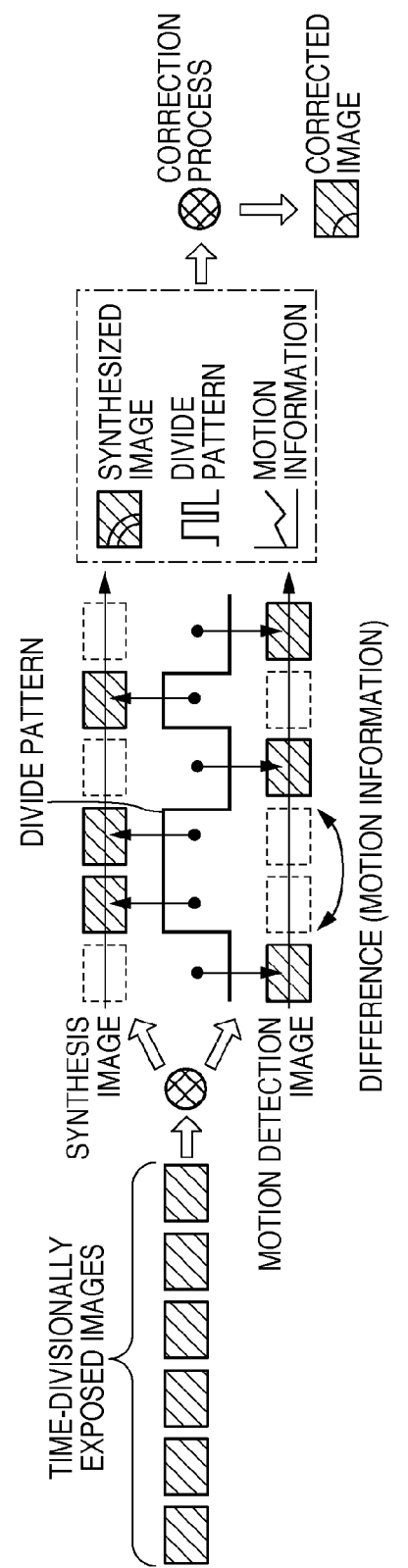
FIG. 10 is a view for explaining an overview of a coded process of this embodiment.

FIG. 10 is a view for explaining an overview of the coded process of this embodiment.

A divide pattern corresponding to the opening and closing pattern is applied to a large number of images captured by time-division exposure to execute a divide process for dividing the images into those adopted as captured images (an upper stage in FIG. 10) and those which are not adopted (a lower stage in FIG. 10). Note that images adopted as captured images will be referred to as "synthesis images", and those which are not adopted will be referred to as "motion detection images".

Next, a detection process for detecting a difference between the motion detection images having neighboring imaging timings as motion information is executed, and a synthesizing process for synthesizing the synthesis images to generate a synthesized image is executed. Then, a correction process is executed based on the synthesized image, divide pattern, and motion information, thereby generating a corrected image in which a blur due to a vibration is corrected.

Note that motion information may be acquired from the motion information detector 426 without detecting it from the motion detection images. When motion information is acquired from the motion information detector 426, the need for calculating the displacement amount can be obviated, and motion information can be obtained at high speed and with high precision.

However, when an imaging condition is set to attain proper exposure, and some images (synthesis images) obtained by the flutter shutter or time-division exposure are to be synthesized, a problem of an image quality drop such as underexposure and an increase in noise is often posed. To solve this problem, the image stabilization unit 428 parallelly executes two coded exposure processes.

Figure 11:
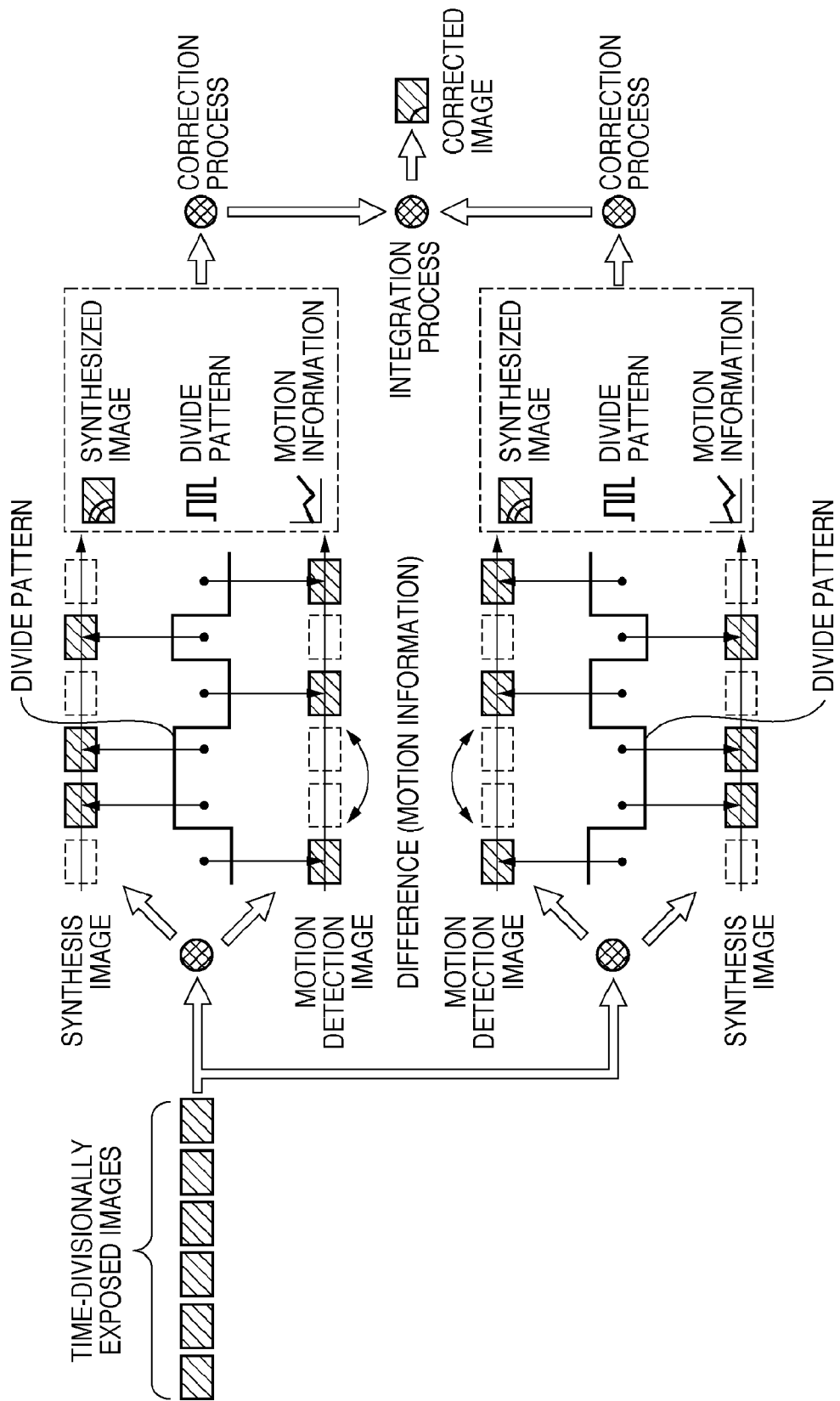
FIG. 11 is a view for explaining an overview of a process of an image stabilization unit.

FIG. 11 is a view for explaining an overview of the processes of the image stabilization unit 428.

A coded exposure process (first process) shown on the upper side of FIG. 11 is the same as that shown in FIG. 10. On the other hand, a coded exposure process (second process) shown on the lower side of FIG. 11 is applied using a divide pattern obtained by reversing that used in the first process. In this manner, image synthesis using all time-divisionally exposed image capturing data can be attained. Note that the processes can be speeded up by temporally parallelly executing the first and second processes. However, these processes need not be temporally parallelly executed. The first and second processes may be alternately executed using the buffer memory to practically parallelly execute the first and second processes.

Figure 12:
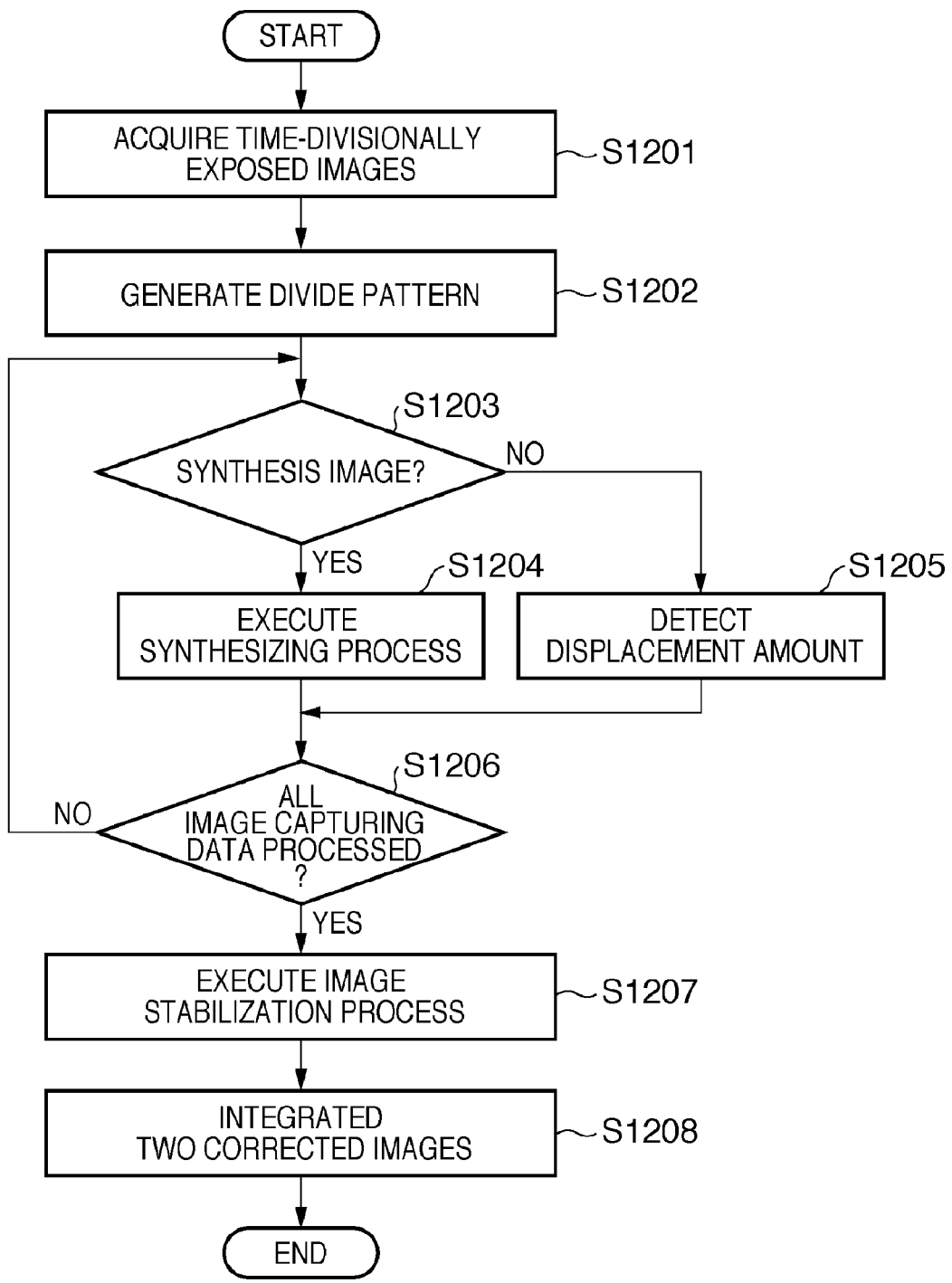
FIG. 12 is a flowchart for explaining the process of the image stabilization unit.

FIG. 12 is a flowchart for explaining the process of the image stabilization unit 428. Note that the two coded exposure processes have the same processing contents except that their divide patterns are reversed. Therefore, one coded exposure process will be mainly explained.

The image stabilization unit 428 acquires a large number of image capturing data which are time-divisionally exposed under the control of the exposure condition generator 427 within an exposure time decided by the photometry unit 414 (S1201). As will be described in detail later, the image stabilization unit 428 generates a divide pattern in which a state corresponding to a synthesis image is represented by '1' and that corresponding to a motion detection image is represented by '0' (S1202).

Then, the image stabilization unit 428 determines according to the divide pattern whether each of the acquired image capturing data is a synthesis image or motion detection image (S1203). Then, the unit 428 synthesizes synthesis images in turn to generate a synthesized image (S1204). This synthesizing process can be a process for simply adding pixel data at the same coordinate positions of the image capturing data to each other. With such synthesizing process, image capturing data equivalent to that obtained by the flutter shutter can be obtained. In a displacement amount detection process (S1205), as will be described in detail later, the unit 428 calculates a displacement of an object between a motion detection image of interest and an immediately preceding motion detection image, and sets the calculated displacement as a displacement amount between the two motion detection images.

The image stabilization unit 428 then determines whether the synthesizing process or displacement amount detection process is complete for all the time-divisionally exposed image capturing data (S1206). If image capturing data to be processed still remain, the unit 428 repeats the processes in steps S1203 to S1205.

After completion of the synthesizing process and displacement amount detection process for all the time-divisionally exposed image capturing data, the image stabilization unit 428 executes an image stabilization process (S1207). That is, the unit 428 applies the image stabilization process to the synthesized image generated in step S1204 using the divide pattern generated in step S1202 and motion information which combines the displacement amounts detected in step S1205, thereby generating image capturing data in which a blur due to a vibration is corrected.

The image stabilization unit 428 integrates the corrected image capturing data obtained by the first and second processes (two coded exposure processes) (S1208), and outputs the integrated data as image capturing data after image stabilization. This integration process may be a process for simply adding pixel data at the same coordinate positions of the image capturing data to each other.

Note that images time-divisionally exposed during a period of the exposure time T may be temporarily buffered in the buffer memory 424, and the processes in step S1201 and subsequent steps may be executed. However, the divide pattern generation process, divide process, and synthesizing process and displacement amount detection process after the divide process may be executed while making time-division exposure.

In this manner, by dividing time-divisionally exposed images based on the divide pattern, a captured image and motion information are simultaneously acquired, thus implementing the image stabilization process equivalent to the coded exposure process. Furthermore, the two coded exposure processes are parallelly executed to compensate for underexposure, thus preventing an image quality drop. Especially, even when the motion information detector 426 is not included or even when it is included but its output is not available, an image blur due to, for example, camera shake can be corrected.

When an image displacement is small, that is, when a vibration is small, image quality can be enhanced by generating a divide pattern which easily selects time-divisionally exposed images as synthesis images.

Generation of Divide Pattern

Some types of divide patterns which are prepared in advance may be held, or a divide pattern may be generated for each imaging in accordance with an object and imaging mode. However, it is indispensable that the divide pattern does not have any periodicity to prevent frequency characteristics from becoming zero. Also, it is desirable that a period is sufficiently longer than an imaging time. Generation of such divide pattern may use, for example, a pseudo random number generation method such as a Mersenne twister which is known to have a very long period.

As described above, in order to attain normal correction in the image stabilization process, it is indispensable that the divide pattern does not have any periodicity. For example, upon making convolution having the same size as the captured size, a periodic pattern has to be prevented from being generated in a numerical value string corresponding to that size. Therefore, the image stabilization unit 428 generates a random divide pattern.

However, in case of a random divide pattern, pseudo edges may be generated in an image including many low-frequency components. For this reason, an image acquired first after the full pressing state (when the switch (SW2) 406 is turned on) is analyzed, and a divide pattern may be decided according to low-frequency components included in that image.

For example, when there are six time-divisionally exposed images, whose second, third, and fifth images are to be divided as synthesis images, and whose first, fourth, and sixth images are to be divided as motion detection images, as shown in FIG. 10, a divide pattern $h(t)=\{0, 1, 1, 0, 1, 0\}$ is generated. As described above, $h'(\theta)$ as the PSF can be obtained by dividing this h(t) by the motion information.

Figure 13:
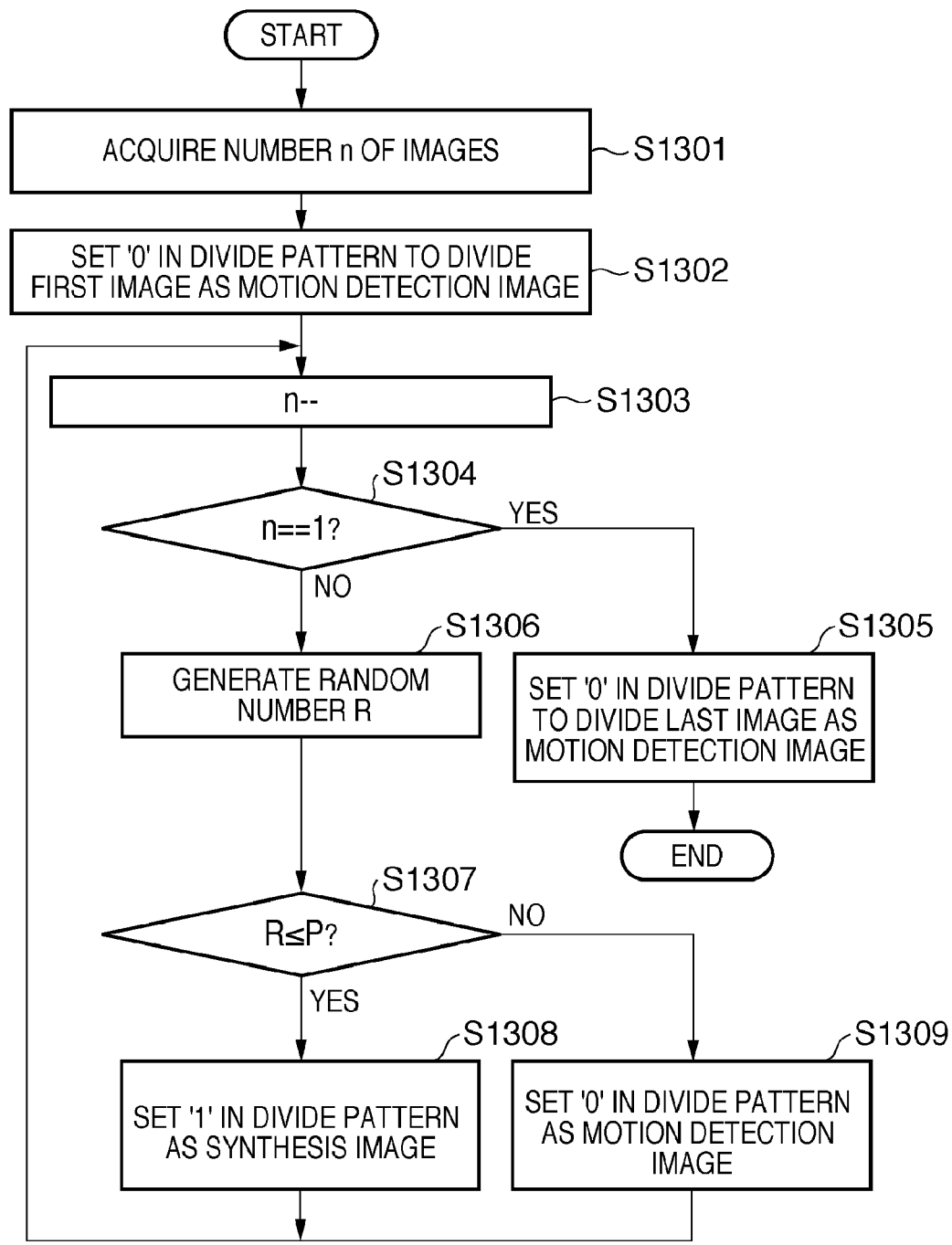
FIG. 13 is a flowchart for explaining a divide pattern generation process.

FIG. 13 is a flowchart for explaining the divide pattern generation process.

The image stabilization unit 428 acquires the number n of images to be time-divisionally exposed from the exposure condition generator 427 (S1301). Then, the unit 428 sets '0' in a divided pattern to divide the first image as a motion detection image (S1302), and decrements the number n of images (S1303).

The image stabilization unit 428 then determines whether or not the number n of images is 1 (S1304). If n=1, the unit 428 sets '0' in the divide pattern to divide the last image as a motion detection image (S1305), thus ending the divide pattern generation process.

On the other hand, if n>1, the image stabilization unit 428 generates a random number R (S1306), and compares the random number R with a probability P of a divide pattern value='1' (S1307). If R≧P, the unit 428 sets '1' in the divide pattern as a synthesis image (S1308); if R<P, it sets '0' in the divide pattern as a motion detection image (S1309). Then, the process returns to step S1303. Note that the probability P is set to be, for example, 50%. However, as described above, when an image displacement is small, a divide pattern which easily selects time-divisionally exposed images as synthesis images may be generated, that is, it may be generated by setting a high probability P.

In this manner, since images at the beginning and end of time-division exposure are divided as motion detection images, and other images are divided as synthesis images according to the probability P, a divide pattern having no periodicity can be generated.

Note that the divide pattern generated by the above process is applied to the first process, and a reversed divide pattern is applied to the second process, needless to say.

Generation of Motion Information

The motion information detected by the image stabilization unit 428 from the motion detection images indicates a displacement in the horizontal direction (to be referred to as a horizontal vibration hereinafter), a displacement in the vertical direction (to be referred to as a vertical vibration hereinafter), and a displacement in the rotation direction (to be referred to as a rotary vibration hereinafter). The image stabilization unit 428 detects horizontal and vertical vibrations first, and then a rotary vibration. This is because it is expected that the horizontal and vertical vibrations are larger than the rotary vibration in terms of the camera shake characteristics. When the horizontal and vertical vibrations are corrected by driving the imaging lens 200 and image capturing device 418 to cancel camera vibrations using the output from the motion information detector 426, the horizontal and vertical vibrations need not be detected.

Figure 14:
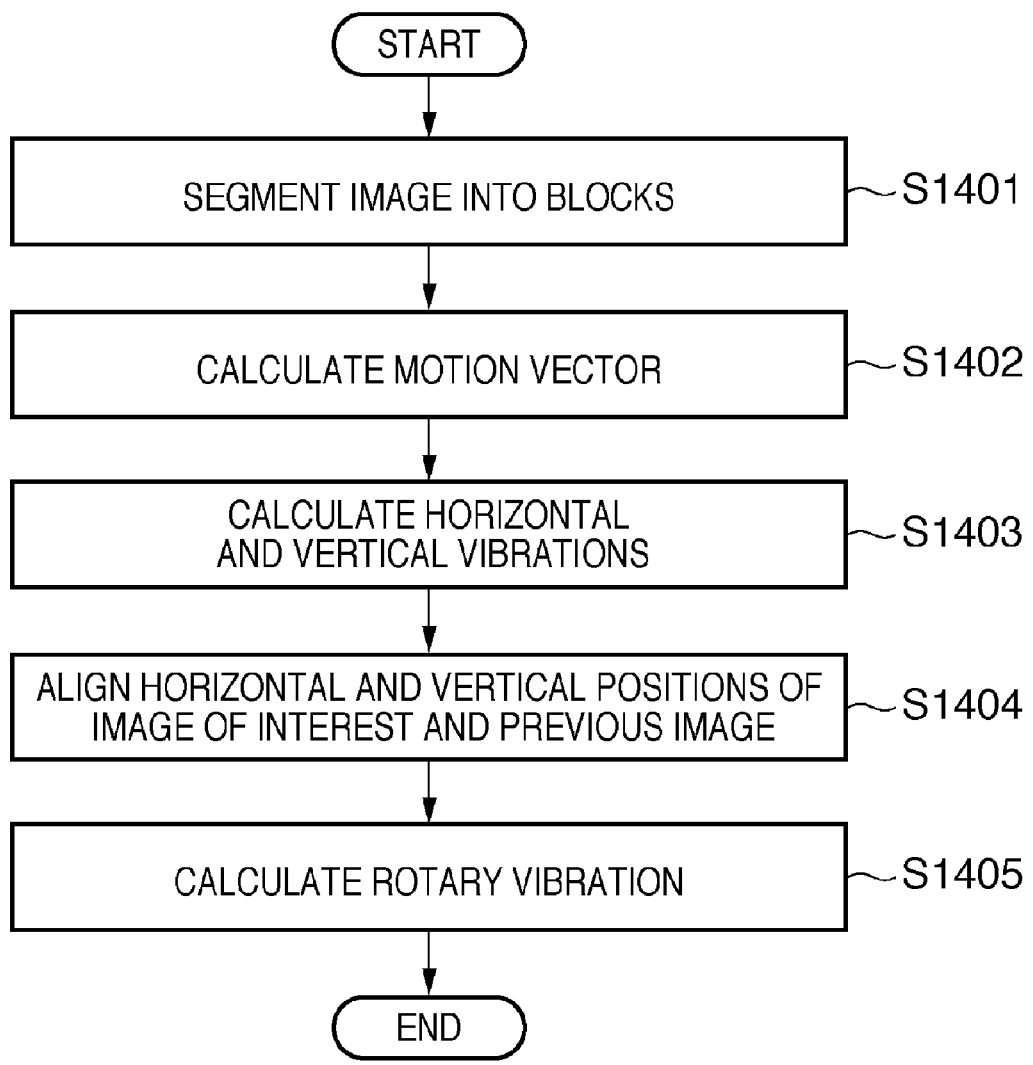
FIG. 14 is a flowchart for explaining a motion information generation process.

FIG. 14 is a flowchart for explaining the motion information generation process.

The image stabilization unit 428 segments a motion detection image of interest (to be referred to as an image of interest hereinafter) into blocks each including m×n pixels (S1401). Then, the unit 428 calculates motion vectors for respective blocks with respect to an immediately preceding motion detection image (to be referred to as a previous image hereinafter) (S1402). The unit 428 calculates a similarity between a block of interest and a block of the previous image (to be referred to as a previous block) corresponding to the block of interest by moving the previous block within a range of ±S pixels from its center. Then, the unit 428 selects a vector which couples the center of the previous block with the highest similarity with that of the block of interest as a motion vector. Assume that the similarity is, for example, a reciprocal of a mean square error between pixel values of pixels of the block of interest and those of pixels of the previous block.

The image stabilization unit 428 then calculates, for example, an average value of horizontal components of the motion vectors of the respective blocks as a horizontal vibration, and that of vertical components of the motion vectors of the respective blocks as a vertical vibration (S1403). Subsequently, the unit 428 moves the image of interest by amounts corresponding to the calculated horizontal and vertical vibrations to match the positions in the horizontal and vertical directions with those of the previous image (S1404), thereby calculating a rotary vibration (S1405). That is, the unit 428 rotates the image of interest to calculate differences between pixels of the image of interest and those of the corresponding previous image, and then calculates an angle corresponding to a minimum average value of the differences between the plurality of pixels as a rotary vibration.

In this manner, synthesis images and motion detection images are selected from an image group captured by time-division exposure based on the divide pattern having no periodicity, and the synthesis images are simply synthesized to generate a synthesized image. Also, motion information is generated from the motion detection images. Then, suitable image stabilization can be applied to the synthesized image using the divide pattern and motion information.

Furthermore, in the image synthesizing process in the image stabilization, an image alignment process, image deformation process, and the like are not required, thus reducing the processing load. Also, motion information can be detected from the motion detection images, and the image stabilization can be implemented without adding any hardware such as a gyro sensor.

Integration of Corrected Images

The integration process for synthesizing two corrected image capturing data obtained by the two coded exposure processes can be a process for simply adding pixel data at the same coordinate positions of the image capturing data to each other. This is because the two divide patterns are reversal patterns.

In this manner, synthesis images and motion detection images are selected from an image group captured by time-division exposure based on the divide pattern having no periodicity, and the synthesis images are simply synthesized to generate a synthesized image. Also, motion information is generated from the motion detection images. Then, suitable image stabilization can be applied to the synthesized image using the divide pattern and motion information.

Furthermore, in the image synthesizing process in the image stabilization, an image alignment process, image deformation process, and the like are not required, thus reducing the processing load. Also, motion information can be detected from the motion detection images, and the image stabilization can be implemented without adding any hardware such as a gyro sensor.

Moreover, the corrected image capturing data obtained by executing the two coded exposure processes using the divide patterns as reversal patterns are synthesized to compensate for underexposure, thus preventing an image quality drop such as an increase in noise.

Second Embodiment

Image processes according to the second embodiment of the present invention will be described below. Note that the same reference numerals in the second embodiment denote the same components as those in the first embodiment, and a detailed description thereof will not be repeated.

The first embodiment has explained the method of obtaining image capturing data in which a vibration is corrected and underexposure is compensated for by two coded exposure processes using divide patterns as reversal patterns. However, by coded exposure processes using a plurality of different divide patterns in place of reversal patterns, image capturing data with higher image stabilization precision can be obtained.

Figure 15:
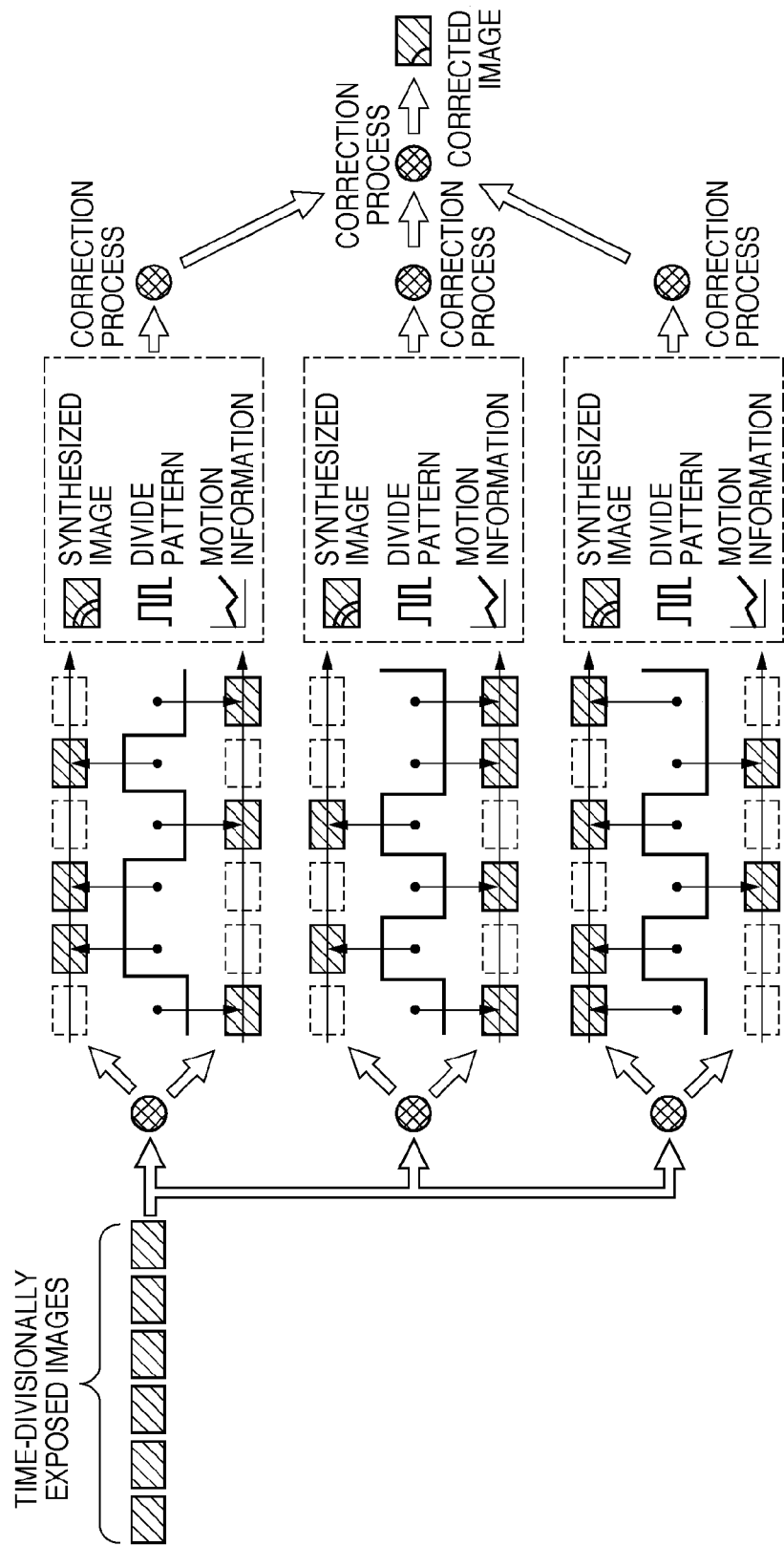
FIG. 15 is a view for explaining an overview of a process of an image stabilization unit according to the second embodiment.

FIG. 15 is a view for explaining an overview of processes of an image stabilization unit 428 according to the second embodiment.

FIG. 15 exemplifies a case using three divide patterns. However, the number of divide patterns is not limited to three, but two different patterns may be used or four or more patterns may be used. The divide patterns may include reversal patterns of other divide patterns.

Respective coded exposure processes are the same as those in the first embodiment, except for divide processes of time-divisionally exposed images using divide patterns and a synthesizing method of corrected image capturing data (corrected images).

When the three divide patterns indicate '1' at 50%, and an integration process for simply adding three corrected images is executed, an exposure amount becomes 1.5 times or equivalent, resulting in overexposure. Hence, respective pixel values are required to be corrected according to the divide patterns. That is, an integration process for adding respective pixels of the three corrected images, and multiplying the pixel values after addition by 1/1.5 (=⅔) is executed. Generally speaking, an integration process for dividing the pixel values after addition by a sum of ratios at which the respective divide patterns indicate '1' (sum total of respective ratios) can be executed. In this manner, the exposure amount after the corrected images are synthesized can be properly set. Note that '1' of each divide pattern indicates division to a synthesis image, as described above.

Third Embodiment

Image processes according to the third embodiment of the present invention will be described below. Note that the same reference numerals in the third embodiment denote the same components as those in the first and second embodiments, and a detailed description thereof will not be repeated.

The above embodiments have exemplified the case in which motion information is acquired from images (motion detection images) which are not adopted as synthesis images of time-divisionally exposed images. However, motion information may be detected from all the time-divisionally exposed images.

Figure 16:
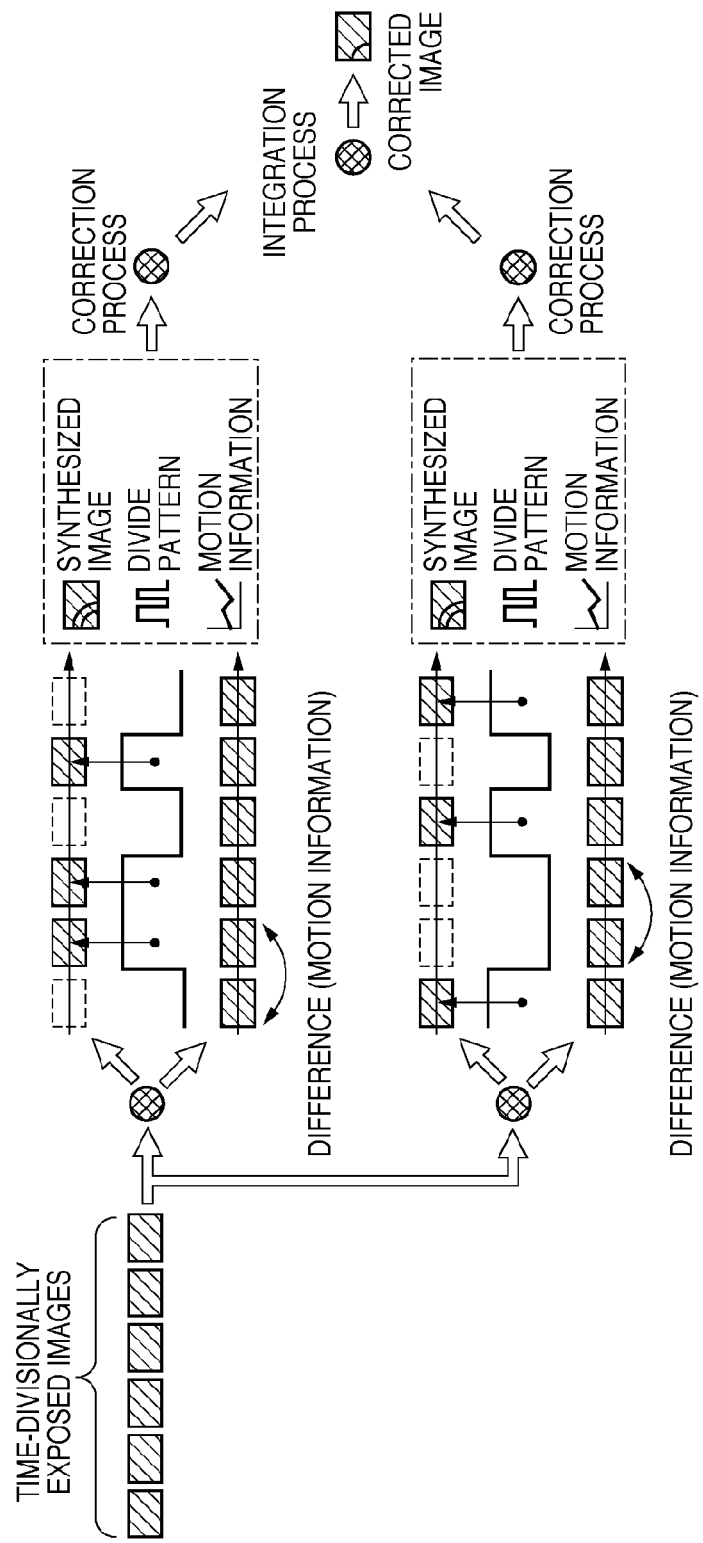
FIG. 16 is a view for explaining an overview of a process of an image stabilization unit according to the third embodiment.

FIG. 16 is a view for explaining an overview of processes of an image stabilization unit 428 according to the third embodiment. As shown in FIG. 16, although synthesis images are selected according to divide patterns, motion detection images are not selected, and all time-divisionally exposed images are used as motion detection images.

FIG. 16 shows an example using divide patterns as reversal patterns as in the first embodiment. Alternatively, a plurality of different divide patterns may be used as in the second embodiment.

Fourth Embodiment

Image processes according to the fourth embodiment of the present invention will be described below. Note that the same reference numerals in the fourth embodiment denote the same components as those in the first to third embodiments, and a detailed description thereof will not be repeated.

The above embodiments have exemplified the case in which motion information is acquired by selecting some or all of time-divisionally exposed images as motion detection images. However, the motion information acquisition method is not limited to the method of acquiring the motion information from images. For example, a motion information detector 426 may include a three-dimensional gyro and three-dimensional acceleration sensor to detect a moving amount of a camera body 100 during imaging as motion information.

Figure 17:
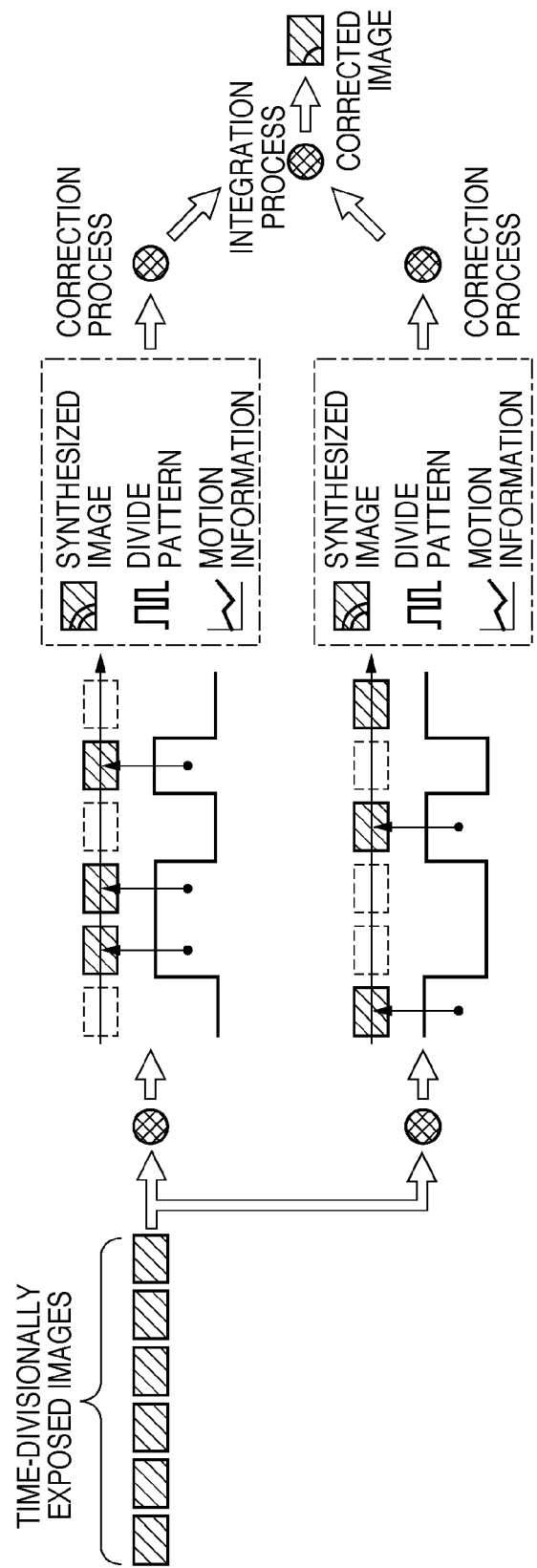
FIG. 17 is a view for explaining an overview of a process of an image stabilization unit according to the fourth embodiment.

FIG. 17 is a view for explaining an overview of processes of an image stabilization unit 428 of the fourth embodiment. As shown in FIG. 17, synthesis images are selected according to divide patterns, and motion information is acquired from the motion information detector 426. In this way, the need for a process for generating motion information from motion detection images can be obviated, and motion information can be obtained at high speed and with high precision.

FIG. 17 shows an example using divide patterns as reversal patterns as in the first embodiment. Alternatively, a plurality of different divide patterns may be used as in the second embodiment.

Modification of Embodiments

Software which realizes the functions and processes of the image stabilization unit 428 and the image processor 425, and a large number of images captured by time-division exposure can be provided for a computer equipment such as a personal computer using a computer-readable storage medium such as a memory card. A CPU of the computer equipment can execute the processes of the image stabilization unit 428 and the image processor 425 by implementing the provided software, and can generate a corrected image, in which a blur due to a vibration is corrected, from the provided images captured by time-division exposure. In this case, the present invention is realized by the computer equipment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123541, filed May 21, 2009, which is hereby incorporated by reference herein in its entirety.

What is claimed is:

1. An image processing apparatus comprising:
   an input section configured to input a plurality of image capturing data time-divisionally exposed by a capturing unit;
   first and second image processors each comprising (i) a determiner configured to determine a subset of the plurality of input image capturing data to be synthesis images according to a divide pattern, (ii) a synthesizer configured to generate synthesized image capturing data by synthesizing the synthesis images, and (iii) a corrector configured to correct vibration of the synthesized image capturing data based on the divide pattern and a motion amount of the capturing unit; and
   an integrator configured to synthesize corrected image capturing data output from the first and second image processors to obtain stabilized image capturing data.

2. The apparatus according to claim 1, wherein a divide pattern used by the first image processor and a divide pattern used by the second image processor are reversal patterns.

3. The apparatus according to claim 1, wherein the determiner randomly divides the plurality of image capturing data into synthesis images or motion detection images, which are used to detect the motion amount, according to the divide pattern.

4. The apparatus according to claim 1, wherein the corrector comprises (i) a generator configured to generate a point spread function based on the divide pattern and the motion amount and (ii) an arithmetic section configured to execute deconvolution of the synthesized image capturing data using the point spread function.

5. An image processing apparatus comprising:
an input section configured to input a plurality of image capturing data time-divisionally exposed by a capturing unit;
a plurality of image processors, each of which comprises (i) a divider configured to divide the plurality of image capturing data into synthesis images or motion detection images according to a divide pattern, (ii) a detector configured to detect a motion amount of the capturing unit at the time of time-division exposure from the image capturing data of the motion detection images, (iii) a synthesizer configured to generate synthesized image capturing data by synthesizing the synthesis images, and (iv) a corrector configured to correct a vibration of the synthesized image capturing data based on the divide pattern and the motion amount; and
an integrator configured to synthesize corrected image capturing data output from the plurality of image processors to obtain stabilized image capturing data.

6. The apparatus according to claim 5, wherein the integrator divides pixel values of the synthesized image capturing data by a sum total of ratios at which the divide pattern of each of the plurality of image processors that indicates a division of the image capturing data into synthesis images.

7. The apparatus according to claim 5, wherein the divider randomly divides the plurality of image capturing data into synthesis images or motion detection images according to the divide pattern.

8. The apparatus according to claim 5, wherein the corrector comprises (i) a generator configured to generate a point spread function based on the divide pattern and the motion amount and (ii) an arithmetic section configured to execute deconvolution of the synthesized image capturing data using the point spread function.

9. An image processing method comprising:
using a processor to perform:
an input step of inputting a plurality of image capturing data time-divisionally exposed by a capturing unit;
first and second processing steps of respectively performing a determination process, a synthetic process, and a correction process, wherein the determination process determines a subset of the plurality of input image capturing data to be synthesis images according to a divide pattern, the synthetic process generates synthesized image capturing data by synthesizing the synthesis images, and the correction process corrects vibration of the synthesized image capturing data based on the divide pattern and a motion amount of the capturing unit; and
a synthesis step of synthesizing corrected image capturing data output in the first and second processing steps to obtain stabilized image capturing data.

10. An image processing method comprising:
using a processor to perform:
an input step of inputting a plurality of image capturing data time-divisionally exposed by a capturing unit;
a plurality of processing steps, each of which performs a divide process, a detective process, a synthetic process, and a correction process, wherein the divide process divides the plurality of image capturing data into synthesis images or motion detection images according to a divide pattern, the detective process detects a motion amount of the capturing unit at the time of time-division exposure from the image capturing data of the motion detection images, the synthetic process generates synthesized image capturing data by synthesizing the synthesis images, and the correction process corrects a vibration of the synthesized image capturing data based on the divide pattern and the motion amount; and
a synthesis step of synthesizing corrected image capturing data output in the plurality of processing steps to obtain stabilized image capturing data.

11. A non-transitory computer-readable medium storing a computer-executable program for causing a computer to perform an image processing method, the method comprising:
an input step of inputting a plurality of image capturing data time-divisionally exposed by a capturing unit;
first and second processing steps of respectively performing a determination process, a synthetic process, and a correction process, wherein the determination process determines a subset of the plurality of input image capturing data to be synthesis images according to a divide pattern, the synthetic process generates synthesized image capturing data by synthesizing the synthesis images, and the correction process corrects vibration of the synthesized image capturing data based on the divide pattern and a motion amount of the capturing unit; and
a synthesis step of synthesizing corrected image capturing data output in the first and second processing steps to obtain stabilized image capturing data.

12. A non-transitory computer-readable medium storing a computer-executable program for causing a computer to perform an image processing method, the method comprising:
an input step of inputting a plurality of image capturing data time-divisionally exposed by a capturing unit;
a plurality of processing steps, each of which performs a divide process, a detective process, a synthetic process, and a correction process, wherein the divide process divides the plurality of image capturing data into synthesis images or motion detection images according to a divide pattern, the detective process detects a motion amount of the capturing unit at the time of time-division exposure from the image capturing data of the motion detection images, the synthetic process generates synthesized image capturing data by synthesizing the synthesis images, and the correction process corrects a vibration of the synthesized image capturing data based on the divide pattern and the motion amount; and
a synthesis step of synthesizing corrected image capturing data output in the plurality of processing steps to obtain stabilized image capturing data.

13. The apparatus according to claim 1, the first and second image processors each further comprises a detector configured to detect the motion amount of the capturing unit at the time of time-division exposure.

14. The apparatus according to claim 13, wherein the determiner divides the plurality of image capturing data into synthesis images or motion detection images according to the divide pattern.

15. The apparatus according to claim 14, wherein the detector detects the motion amount from image capturing data of the motion detection images.

* * * * *